Dec. 16, 1958  P. N. RAWSON  2,864,263
TRANSMISSION BELT
Filed March 8, 1954  3 Sheets-Sheet 1

PHILIP N. RAWSON
INVENTOR.

BY Herbert J. Brown
ATTORNEY

Dec. 16, 1958 P. N. RAWSON 2,864,263
TRANSMISSION BELT
Filed March 8, 1954 3 Sheets-Sheet 2
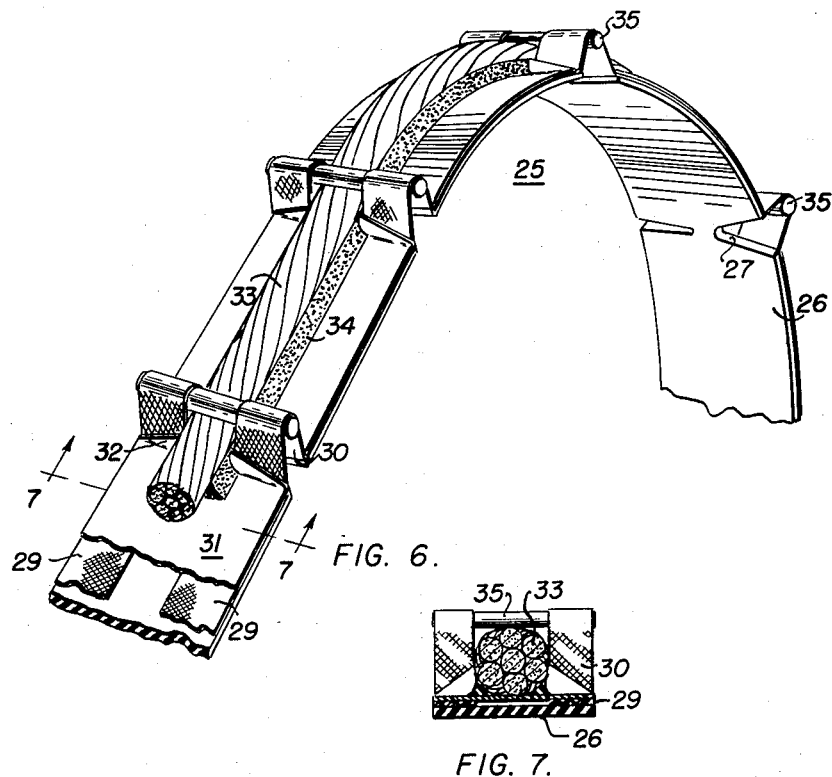
FIG. 6.
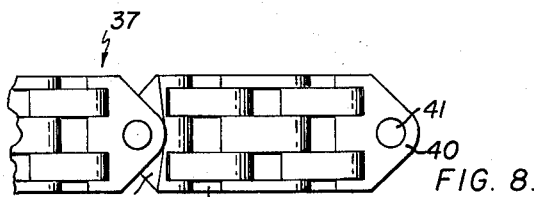
FIG. 7.
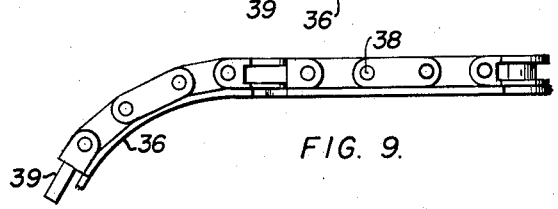
FIG. 8.
FIG. 9.
PHILIP N. RAWSON
INVENTOR.
BY *Herbert J. Brown*
ATTORNEY Dec. 16, 1958  P. N. RAWSON  2,864,263
TRANSMISSION BELT
Filed March 8, 1954  3 Sheets-Sheet 3

PHILIP N. RAWSON
INVENTOR.

BY
ATTORNEY

United States Patent Office 2,864,263
Patented Dec. 16, 1958

2,864,263

TRANSMISSION BELT

Philip N. Rawson, Fort Worth, Tex.

Application March 8, 1954, Serial No. 414,779

5 Claims. (Cl. 74—235)

This invention relates to variable speed cone transmissions, and has reference to a belt therefor. This application is a continuation in part of my copending application, Serial No. 140,065, dated January 23, 1950, now abandoned.

An object of the invention is to provide a self-aligning belt for a cone type transmission, and which belt is capable of carrying relatively heavy loads as compared with elastic belts used for that purpose.

Another object of the invention is to provide a belt for a cone type transmission, and which belt will not change its position on the pulleys even though subjected to load variations.

Generally stated, the invention contemplates a segmented transmission belt in which each segment has a surface for frictionally engaging a cylindrical or conical pulley, and in which each segment is long enough in relation to its thickness and flexible enough to bend around the circumference of the pulley, yet at the same time is capable of resisting lateral and diagonal distortion within the plane of each normally flat segment. The segments are pivotally connected with each other for lateral movement, and which pivotal connections are located along a single line lengthwise of the belt.

These and other objects will become apparent from the following description and the accompanying drawings, wherein:

Figure 6 is an enlarged broken perspective view of the last referred to belt and showing details of construction.

Figure 7 is a transverse sectional view taken on line 7—7 of Figure 6.

Figure 8 is a broken top plan view of a modified form of belt within the scope of the present invention.

Figure 9 is a side elevation of the belt shown in Figure 8.

Figure 1:
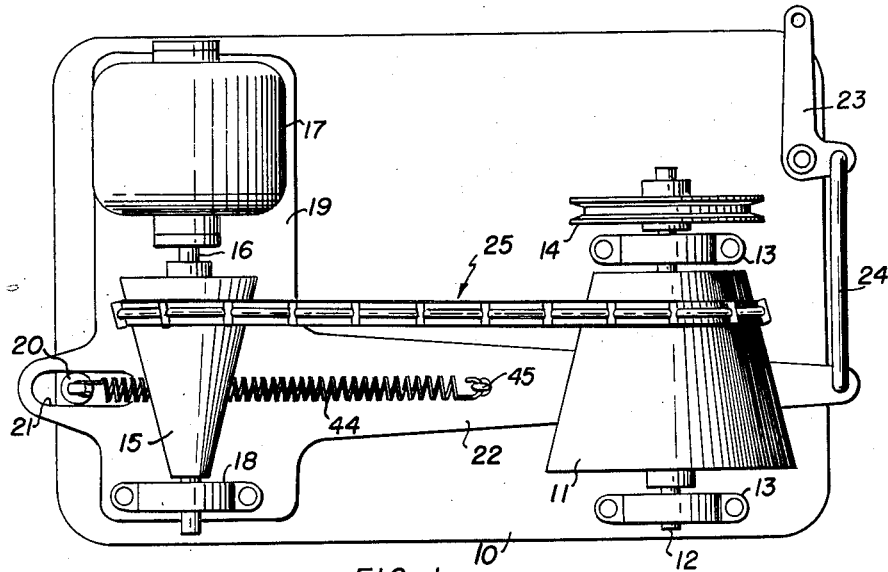
Figure 1 is a top plan view of a cone type transmission including a belt embodying the features of the invention.
Figure 2:
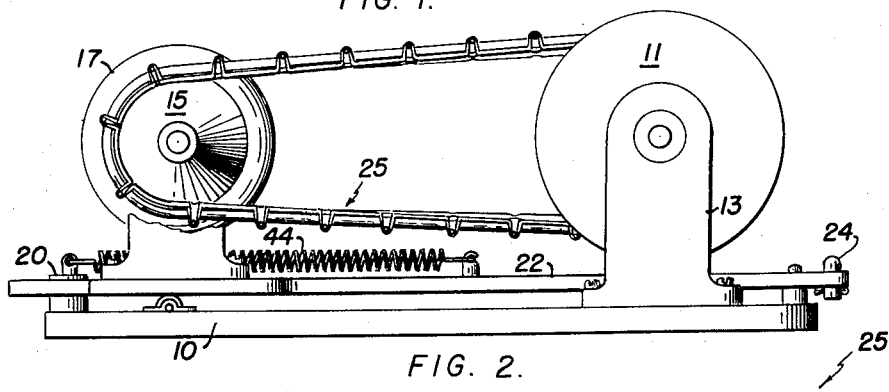
Figure 2 is a broken front elevation of the transmission illustrated in Figure 1.
Figure 3:
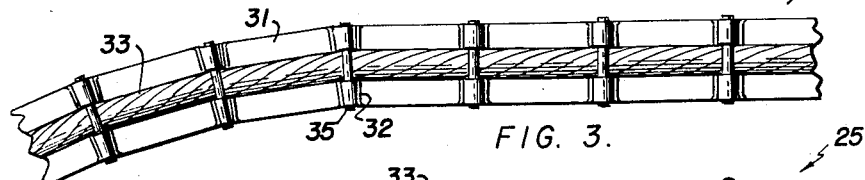
Figure 3 is a broken top plan view of a transmission belt embodying the features of the invention showing lateral curvature as it goes around a pulley.
Figure 4:
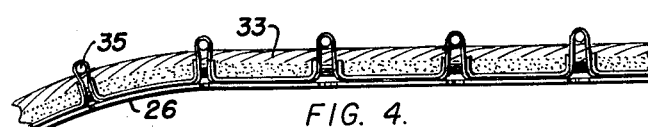
Figure 4 is a side elevation of the belt shown in Figure 3.
Figure 5:
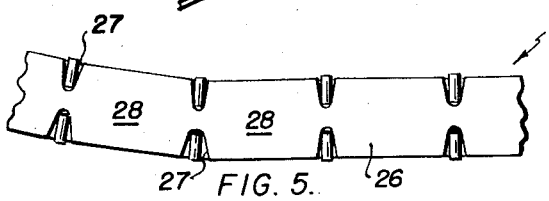
Figure 5 is a bottom plan view of the belt shown in Figures 3 and 4.

The transmission shown in Figures 1 and 2 is representative, and includes a base 10 and a driven cone pulley 11 mounted on a shaft 12. The shaft 12 is supported in bearings 13 mounted on the base 10, and a driven pulley 14 is secured to the shaft. The driven cone pulley 11 is driven by a driving cone pulley 15 mounted on a shaft 16 extending from a motor 17. The motor 17 and the bearing 18 on the outer end of the driving pulley 15 are supported on the flat mount 19 pivotally secured to the base 10 by means of a round boss 20 received within a slot 21 in said flat mount. Preferably, the slot 21 is perpendicular to the length of the drive shaft 16. An arm 22 extends from the flat mount 19 and is connected with a bell crank 23 by means of a connecting link 24.

A preferred belt construction 25 is shown in Figures 1 through 6, and includes a flexible tread 26 divided into segments by means of notches 27 in each side thereof. The segments of the tread 26 are identified by the numeral 28. Flexible tapes 29, of fabric or the like, are secured by bonding to the upper side surfaces of the tread 26, each tape 29 being outwardly looped, as at 30, at each tread notch 27. On the outer surface of each tread segment 28, and positioned over corresponding lengths of tape 29, there are flexible stiffeners 31 having upturned flanges 32 on each end thereof, the central portions of which flanges are arcuately notched to receive an endless cord or cable 33. The cord or cable 33 is positioned between the parallel tapes 29 and the loops formed at the ends of the tread segments 28, and which cord or cable is additionally secured to the outer surface of each stiffener 31 by means of a flexible adhesive 34. Pins 35 are positioned in the tape loops 30 and over the cable or cord 33. The described arrangement of tape loops 30 serves a twofold purpose; (a) to hold the cable or cord 33 in place by means of the pins 35, and (b) to prevent the tread segments 28 and stiffeners 31 from turning about the length of the belt.

The modified form of the invention shown in Figures 8 and 9 is comprised of tread segments 36 having chain link segments 37 of corresponding shape bonded to the outer surfaces thereof. Each chain link segment 37 is comprised of parallel chain links mounted on pivot pins 38, and the terminal links 39 and 40 are respectively grooved and tongued and have perpendicular pivot pins 41 positioned therethrough.

Figure 10:
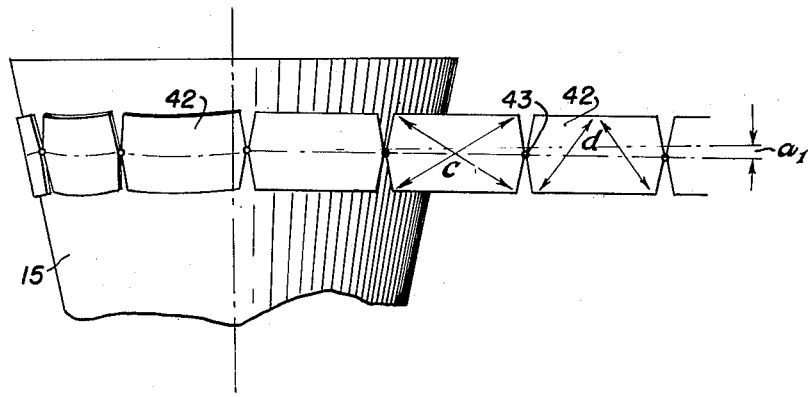
Figure 10 is a plan schematic view of the belt and showing the relative position of the same on the large end of a cone pulley.
Figure 11:
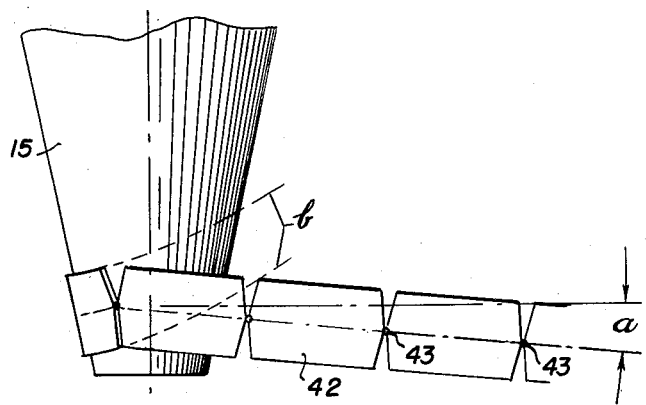
Figure 11 is a view similar to Figure 10, but showing the position of the belt on the small end of a cone type pulley.

The geometry of the invention is illustrated in Figures 10 and 11 wherein the segments of both forms of the invention are referred to by the numeral 42 and wherein the pivots therebetween are designated by the reference numerals 43. It is to be understood that the flexible cord or cable 33 as described in connection with the form of the invention illustrated in Figures 1 through 7 provides pivotal means between the first described segments 28. The tension of the belt causes the individual flexible segments 42 to conform with the contour of the surface of the cone pulley 15 or 11. If the belt were in the form of a flat strip, the same would move along the surface of the pulley as indicated by the letter $b$. The tendency of such path is overcome by reason of the pivots 43 between the segments 42. Thus, the tread surface of each segment is in contact with the pulley surface as the same passes therearound. Each segment 42 is diagonally stable as indicated by the arrows $c$ and $d$; thus, the individual segments 42 may entirely grip the surface of the pulley when in contact therewith. The climbing effect of the individual segments 42, indicated by $b$, is offset by the angle of approach $a$. If it were not for the diagonal stability of the segments as indicated by arrows $c$ and $d$, the continuous tendency of the belt to climb would be nullified, thus eliminating the self-positioning characteristics of the belt. In operation, the angle of approach $a$ neutralizes the climbing tendency in varying degrees since the degree of the angle of approach determines the running position of the belt on the cones 11 and 15. As shown in Figure 11, the angle $a$ is relatively large, thus positioning the belt on the small end of the cone. In Figure 10 the angle $a_1$ is relatively small, thus positioning the belt on the large end of the cone. While the axes of the cone supporting shafts 12 and 16 are always substantially parallel with each other, by slight change of parallelism the belt 25 may be shifted to any desired running position. In the exemplary transmission shown in Figures 1 and 2 such change in parallelism is carried out by operating the bell crank 23 with a resulting change of position on the pulleys 11 and 15. After the belt 25 assumes a desired running position the bell crank 23 is allowed to remain in its selected position. Tension may be applied to the belt 25 at all times by means of a coiled spring 44 connected between the boss 20 on the base 10 and an eye 45 secured to the motor mount arm 22.

What is claimed is:

1. An endless belt for a cone type transmission, said belt being comprised of normally flat flexible segments arranged end to end, and pivotal means connecting said segments along the center line of the belt, said pivotal means each having at least one effective axis perpendicular to the inner surface of said belt at said center line, said segments being at least as long as the width thereof and being individually flexible around the cones of the transmission and resistant to distortion laterally and diagonally within the planes of said normally flat segments.

2. An endless belt for a cone type transmission as defined in claim 1, and wherein the inner surfaces of said segments are provided with resilient flexible friction treads.

3. An endless belt for a cone type transmission as defined in claim 1, and wherein said segments are provided with means therebetween preventing the same from rotating about the length of the belt.

4. An endless belt for a cone type transmission as defined in claim 1, and wherein said segments are of chain link construction wherein the individual segments are provided with multiple transverse pivots.

5. An endless belt for a cone type transmission as defined in claim 1, and wherein said pivotal means connecting said segments is comprised of a continuous flexible cord extending around and secured to said segments along the centerline thereof.

References Cited in the file of this patent

UNITED STATES PATENTS

| | | |
|---|---|---|
| 405,434 | Schieren | June 18, 1889 |
| 657,855 | Coleman | Sept. 11, 1900 |
| 856,565 | Balch | June 11, 1907 |
| 1,175,633 | Howl et al. | Mar. 14, 1916 |
| 1,260,307 | Blanton | Mar. 26, 1918 |
| 1,490,037 | Shideed | Apr. 8, 1924 |
| 1,580,998 | Crocker | Apr. 13, 1926 |
| 2,374,267 | Berg | Apr. 24, 1945 |

FOREIGN PATENTS

| | | |
|---|---|---|
| 134,061 | Switzerland | Sept. 16, 1929 |
| 383,635 | Great Britain | Nov. 9, 1932 |